United States Patent
Hoess

(10) Patent No.: US 8,616,317 B2
(45) Date of Patent: Dec. 31, 2013

(54) VEHICLE HAVING AT LEAST ONE COOLING CIRCUIT FOR COOLING A FUEL CELL SYSTEM

(75) Inventor: Ralf Hoess, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/393,123

(22) PCT Filed: Jul. 9, 2010

(86) PCT No.: PCT/EP2010/004201
§ 371 (c)(1),
(2), (4) Date: Feb. 28, 2012

(87) PCT Pub. No.: WO2011/023261
PCT Pub. Date: Mar. 3, 2011

(65) Prior Publication Data
US 2012/0160581 A1 Jun. 28, 2012

(30) Foreign Application Priority Data
Aug. 29, 2009 (DE) .................. 10 2009 039 364

(51) Int. Cl.
*B60K 11/00* (2006.01)

(52) U.S. Cl.
USPC ....................................... 180/68.4; 429/435

(58) Field of Classification Search
USPC ........ 180/68.1, 68.2, 68.4; 429/434, 435, 436
See application file for complete search history.

(56) References Cited

U.S. PATENT DOCUMENTS

| 6,370,903 B1* | 4/2002 | Wlech .................... 62/324.6 |
| 7,191,858 B2* | 3/2007 | Vanderwees et al. ...... 180/65.31 |
| 7,823,671 B2* | 11/2010 | Inoue et al. ................. 180/68.4 |
| 7,845,392 B2* | 12/2010 | Morita ............................ 165/43 |
| 2001/0049040 A1 | 12/2001 | Grune et al. |
| 2005/0039959 A1 | 2/2005 | Fruhauf et al. |
| 2006/0207815 A1* | 9/2006 | Vandekerkhof .............. 180/68.4 |
| 2006/0269809 A1 | 11/2006 | Sakai et al. |

FOREIGN PATENT DOCUMENTS

| DE | 196 29 084 A1 | 1/1998 |
| DE | 10 2005 021 413 A1 | 5/2006 |
| JP | 2000-315513 A | 11/2000 |
| JP | 2005-251416 A | 9/2005 |
| JP | 2006-69423 A | 3/2006 |
| JP | 2006-336974 A | 12/2006 |
| JP | 2007-321633 A | 12/2007 |
| JP | 2009-126191 A | 6/2009 |
| WO | WO 03/059664 A1 | 7/2003 |

OTHER PUBLICATIONS

International Search Report with English translation dated Nov. 15, 2010 (four (4) pages).

* cited by examiner

*Primary Examiner* — John Walters
(74) *Attorney, Agent, or Firm* — Crowell & Moring LLP

(57) ABSTRACT

A vehicle includes at least one cooling circuit for cooling a fuel cell system. The cooling circuit includes at least one cooling heat exchanger, a cooling medium transportation device and a heat exchanger in a fuel cell stack of fuel cell system. Cooling heat exchanger is affected by motion-related air flow as cooling air. The cooling heat exchanger is constructed in at least two stages, which are arranged in such a way that they are serially flowed through, one after another, by motion-related airflow.

12 Claims, 3 Drawing Sheets

VEHICLE HAVING AT LEAST ONE COOLING CIRCUIT FOR COOLING A FUEL CELL SYSTEM

BACKGROUND AND SUMMARY OF THE INVENTION

Figure 1:
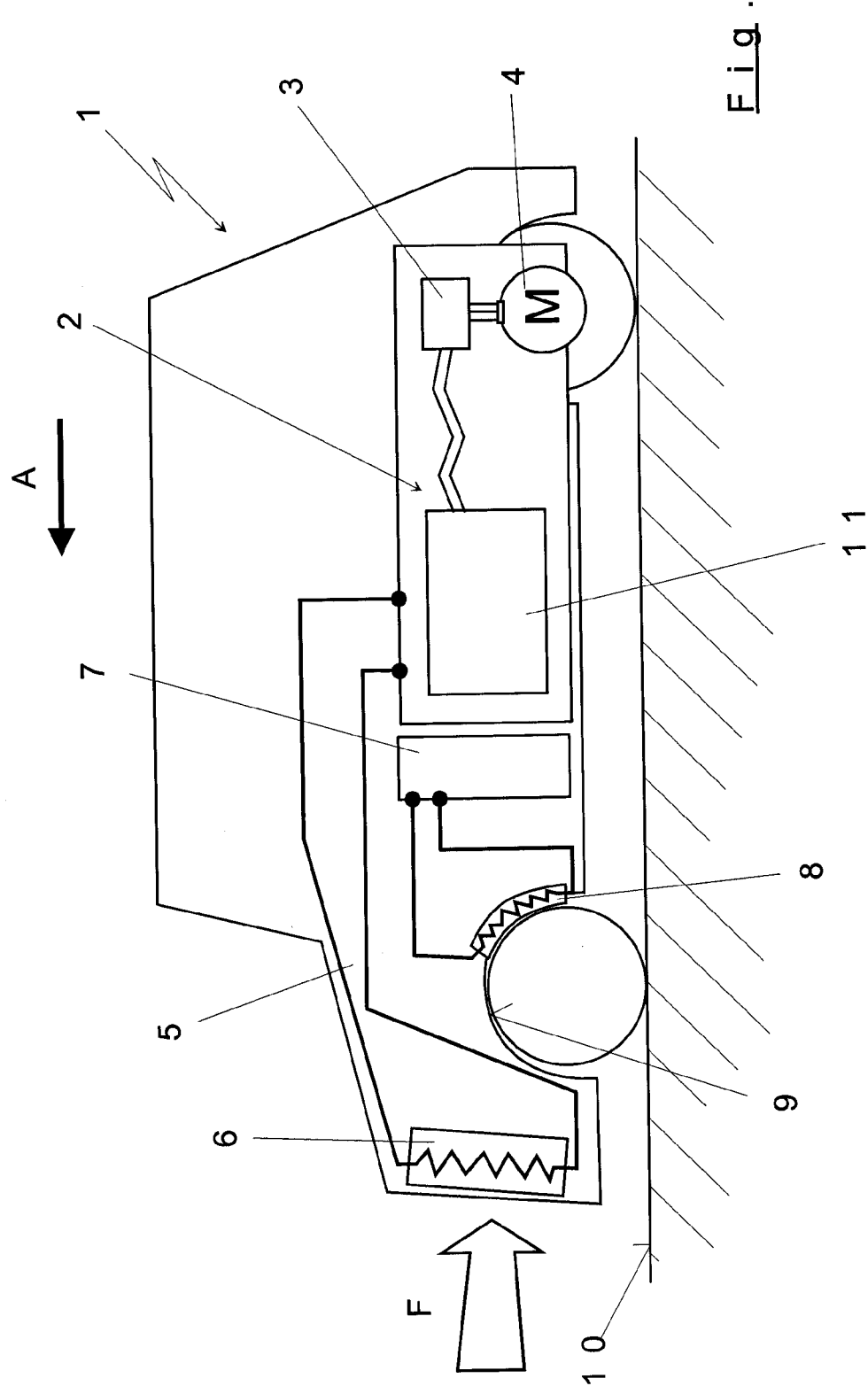

The invention relates to a vehicle with at least one cooling circuit for cooling a fuel cell system.

A fuel cell system for a vehicle is disclosed in German Patent Document DE 196 29 084 C2. The fuel cell system includes a primary cooling heat exchanger, which, analogously to vehicles with internal combustion engines, is arranged in such a way that the dynamic pressure of the motion-related airflow ensures throughflow of ambient air as cooling air. In order to make use of the dynamic pressure, basically only the front surfaces of the vehicle can be used for the cooling heat exchangers. This involves corresponding limitations and disadvantages, which are described in the following paragraphs, together with other problems.

The heat dissipation during operation of fuel cell drive systems in the case of PEM fuel cell applications represents a problem that places a limitation on performance, as the greater part of the waste heat that is generated has to be dissipated into the environment via the cooling circuit where there are only small differences in temperature. In system designs that are suitable for use in practice, as a rough starting point it can be assumed that around the same level of waste heat has to be dissipated via the cooling circuit as electrical power is generated in the fuel cell.

Heat dissipation of the cooling circuit can in principle be improved by enlarging the cooling surface, improving the throughflow of the cooling heat exchanger or by raising the temperature of the cooling medium. Cooling concepts developed to date according to the general state of technology make use of one or several of these aspects, but are associated with the disadvantages or restrictions described below.

The maximum operating temperatures of the PEM fuel cell stacks of today lies at around 80-90° C. Efforts to increase the temperature affect the durability (lifetime) of the fuel cell and from today's point of view can be considered as a long-term target. In addition, water-based cooling circuits only permit very limited further increases in temperature, while cooling media capable of functioning at high temperature (e.g., thermo-oils) have higher sealing requirements, increased costs and more complex handling. The raising of the front surface of the cooling heat exchanger, and only in this situation does the effect described in the aforementioned DE 196 29 084 C2 with regard to the dynamic pressure occurs subject to severe limitations in automotive engineering. The main limiting factors are package and design specifications, and also the desire to achieve the lowest-possible air resistance factor (cw.A-Wert) in the interests of low vehicle energy consumption. Improvement of cooling effects using high-performance fans also brings serious disadvantages. The necessary drive power for the fans leads to a considerable increase in parasitic losses. This means that the efficiency rating of the system is reduced. In addition, vehicle acoustics suffer negative impact.

For these reasons, the heat dissipation capability of the cooling circuit presents a limiting factor for the electric performance of mobile fuel cell systems in vehicles. In order to provide a solution to these problems in the fuel cell systems in vehicles, German Patent Document DE 10 2005 021 413 A1 discloses the use of additional surfaces in the area of the vehicle as a cooling surface. However, the design of the vehicle is then changed accordingly, which is often not desired.

Furthermore, a cooling circuit for a fuel cell vehicle is described in U.S. Pat. No. 6,370,903 B1, which uses a high-temperature cooling circuit with a cooling heat exchanger utilizing the motion-related airflow for cooling of the fuel cell itself. In addition, for cooling of the drive motor and of the electrical and electronic components of the vehicle, a low-temperature cooling circuit is shown in a known form that is also cooled by a cooling heat exchanger utilizing the motion-related airflow.

Vehicles are currently equipped with a climate control device which, according to the embodiment described here, can be used for climate control of an interior of a vehicle and for support of the cooling circuit of the fuel cell. The installation is shown as a heat pump.

Basically it is the case that a climate control system also has to be provided with a climate control cooling heat exchanger in order to cool or condense the climate control medium used in the climate control system. The installation is of such a type that very often this climate control cooling heat exchanger is integrated into the cooling circuit of the fuel cell, or, as described in U.S. Pat. No. 6,370,903 B1, is integrated into the low-temperature cooling circuit for the electronic components.

In such integration, in the case of use of the climate control equipment for cooling the interior of the vehicle, the disadvantage always occurs that the amount of heat entering the cooling circuit is further increased so that, in particular in the presence of very high ambient temperatures, the cooling of the fuel cell stack is worsened further. Because of this worsening of the cooling of the fuel cell stack, the performance capability of the vehicle equipped with the fuel cell system is correspondingly reduced. The supporting cooling of the fuel cell cooling circuit mentioned in U.S. Pat. No. 6,370,903 B1 by means of an evaporator of the climate control device, exhibits the disadvantage that such cooling is associated with a comparatively high use of energy in the climate control device, so that the overall efficiency rating of a vehicle thus equipped suffers.

Exemplary embodiments of the present invention provide a vehicle with at least one cooling circuit for cooling of a fuel cell system that enables a maximum cooling performance with the minimum energy requirement, and therefore allows high performance capability of the fuel cell system, even in the case of difficult ambient conditions.

Because the cooling heat exchanger in the vehicle according to the invention is designed with at least two stages, the surface available for cooling in the cooling heat exchanger is considerably increased. The arrangement of the at least two stages of the cooling heat exchanger so that they are blown through by the motion-related airflow as cooling air serially, one after another, means that the at least two stages can be used without the necessary flow surface having to be greater. The installation can therefore be integrated into existing vehicle concepts without problem, as only the thickness of the entire cooling heat exchanger or the stack of the stages of the cooling heat exchanger in the direction of driving is increased because of the higher number of stages, without the need for a greater flow surface.

According to one embodiment of the vehicle according to the invention, the at least two stages of the cooling heat exchanger are flowed through by a cooling medium flowing in the cooling circuit serially, one after another, whereby the stage last flowed through by the motion-related airflow is flowed through first by the cooling medium. As the individual stages of the cooling heat exchanger are arranged one behind the other in the direction of travel, these are also flowed through after one another by the motion-related airflow as cooling air. This means that in the individual stages there is a different temperature differential between the cooling medium to be cooled in the respective stage and the motion-related airflow as cooling air which cools this cooling medium. Correspondingly, the individual stages of the cooling heat exchanger can be cooled to different levels. Because the individual stages are arranged in such a way that they are flowed through serially by the cooling medium, it can now be achieved that the stage of the cooling heat exchanger that is flowed though by the warmest cooling medium is already cooled by the warmest motion-related airflow, in other words the motion-related airflow that has already been heated by the other stage. This means that the cooling of the cooling medium is implemented in the best possible way, as the cooling medium that is still very warm is cooled by comparatively warm motion-related airflow, so that there is a sufficient difference in temperature in order to achieve at least preliminary cooling of the cooling medium in the first stage (from the point of view of the cooling medium) and in the last stage (from the point of view of the motion-related airflow). In the one or the subsequent stages, the cooling medium then will be progressively colder, in the same way as the motion-related airflow, so that a complete cooling of the cooling medium to the temperature level which is needed for the full performance capability of the fuel cell system can be attained.

In an advantageous further development of the vehicle according to the invention, the cooling circuit includes a first section as high-temperature cooling circuit for cooling of the fuel cell stack, whereby in parallel to the cooling heat exchanger a second section is designed as a low-temperature circuit for cooling of electrical and/or electronic components, whereby a low-temperature cooling heat exchanger is provided and located in the cooling circuit parallel to the at least two-stage cooling heat exchanger in such a way that the low-temperature cooling heat exchanger is flowed through by the motion-related airflow serially to the at least two stages of the cooling heat exchanger. According to this particularly advantageous further development of the vehicle according to the invention, a low-temperature cooling heat exchanger in the form of a further stage from the point of view of the motion-related airflow is arranged serially to the at least two stages of the cooling heat exchanger. Accordingly, the installation facilitates integration of the low-temperature cooling circuit that is already known and generally used according to the state of technology in fuel cell driven vehicles for cooling of electrical and/or electronic components such as for example, the drive motor and the power electronic components, into the actual cooling circuit. The low-temperature cooling circuit is then designed as a second section of the cooling circuit, so that additional tube elements and also possibly an additional cooling medium transportation device are not required.

According to one of the possible embodiments of the vehicle, the vehicle also includes a climate control device. In the embodiment according to the invention, it is now particularly advantageous if the climate control device includes at least one climate control heat exchanger, in order to cool the climate control medium used in the climate control device, whereby the climate control heat exchanger is designed so as to be independent of the cooling circuit for the fuel cell system. This independence of the climate control cooling heat exchanger for cooling or condensing of the climate control medium of the climate control device from the cooling circuit of the fuel cell system, ensures that no additional heat is taken into the cooling circuit for the fuel cell system via the cooling of the climate control medium. It is rather the case that this heat, which occurs particularly in the presence of high ambient temperatures when cooling of the fuel cell system is in any case difficult, is cooled down elsewhere, so that this additional heat does not exercise a negative influence on the fuel cell system or its cooling.

This means that the fuel cell system can be cooled independently of the climate control device and can retain its performance capability.

In a particularly favorable further development of this, the at least one climate control heat exchanger is arranged in or in front of a wheel arch of the vehicle. This arrangement in the wheel arches of the vehicles can be completely independent of the cooling surface of the at least two-stage cooling heat exchanger of the cooling circuit for the fuel cell system, without removing any of the surface available to it over which a dynamic pressure of the motion-related airflow flows. In addition, the arrangement in or in front of the wheel arches to a large extent excludes negative influence on the appearance of the vehicle, so that attention is not drawn to these additional climate control cooling heat exchangers or only minimal attention is drawn to them.

Further advantageous embodiments of the invention can be found in the remaining dependent claims and become clear from the example of the embodiment which is explained in more detail below with reference to the drawings.

BRIEF DESCRIPTION OF THE DRAWING FIGURES

Figure 2:
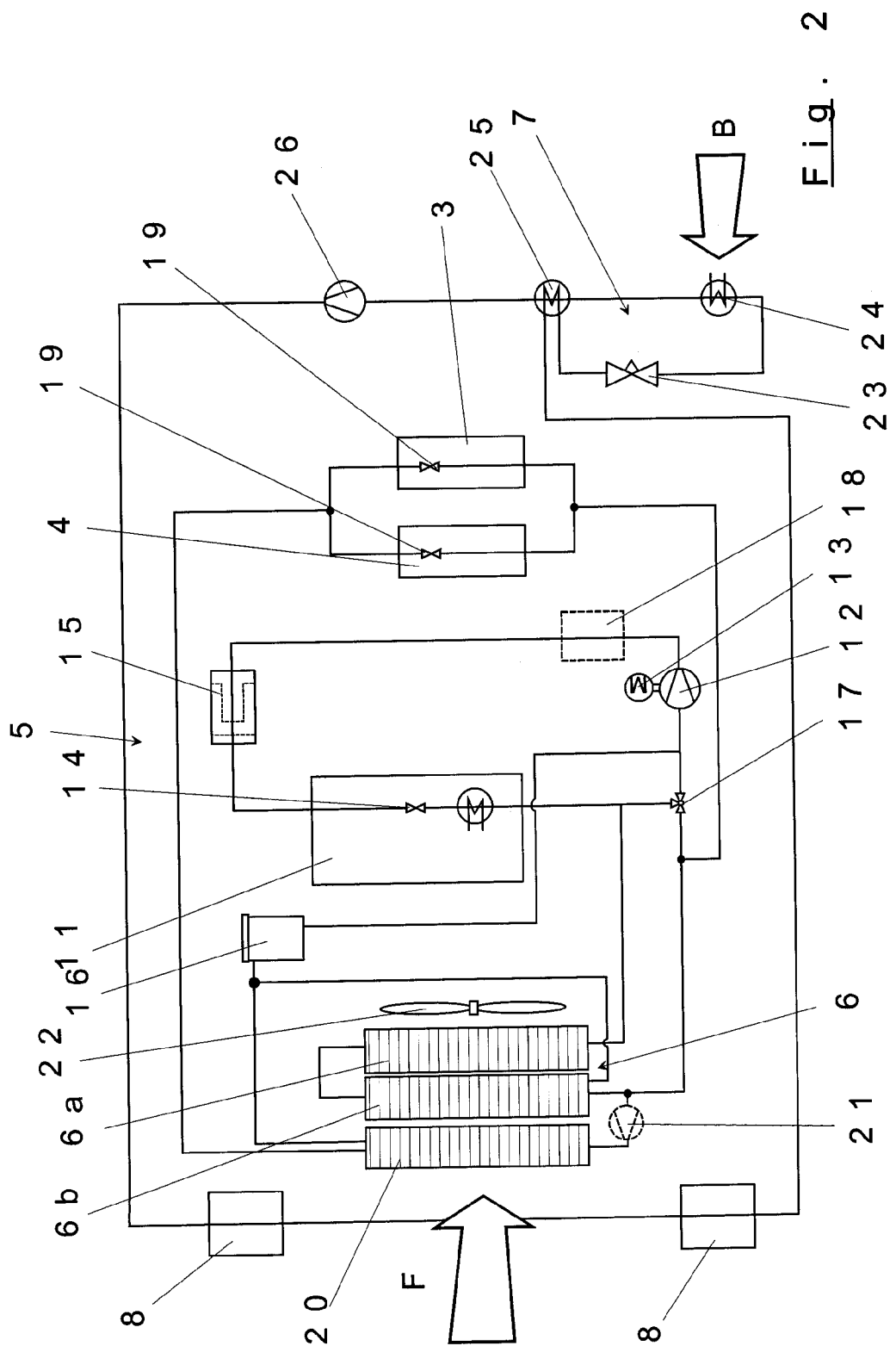
Figure 3:
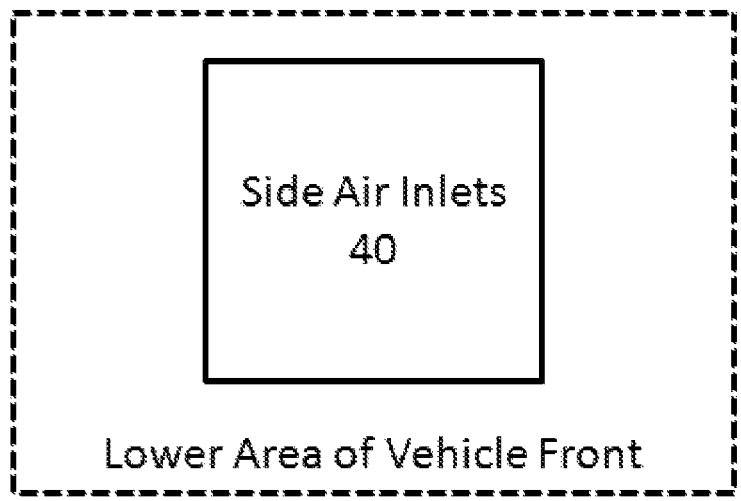

The drawings are as follows:
FIG. 1 a schematic view of a vehicle according to the invention;
FIG. 2 a cooling circuit of the vehicle according to the invention in a preferred embodiment;
FIG. 3 side air inlets in a lower area of the vehicle front; and
FIG. 4 mudguard with opening in area of wheel arch.

DETAILED DESCRIPTION

In the representation in FIG. 1, a vehicle 1 is shown in exemplary form comprising a fuel cell system 2, through which electrical drive power is provided for vehicle 1. Vehicle 1 is driven by a corresponding electronic system 3 and an electrical drive in the form of an electric machine 4, which in particular can also be used as a motor or, in a fashion already known, as a generator during vehicle braking. Fuel cell system 2 also includes at least one cooling circuit, which is indicated by tubes 5. A part of cooling circuit 5 is a cooling heat exchanger 6 arranged in the front area of vehicle 1, in other words in the direction of travel A at the front. In a known manner, a corresponding dynamic pressure occurs in the front area of vehicle 1, which flows through cooling heat exchanger 6 as motion-related airflow F and cools the cooling medium circulating in cooling circuit 5, typically an anti-freeze substance mixed with water.

Vehicle 1 in the representation in FIG. 1 should also be provided with a climate control device 7, which in known fashion is designed for climate control of the interior space of vehicle 1. For cooling or condensation of the climate control medium used in climate control device 7, climate control device 7 requires at least one climate control cooling heat exchanger 8, which here is present independently of the cooling heat exchanger 6 of the fuel cell system 2 or cooling circuit 5 of fuel cell system 2. This climate control cooling heat exchanger 8 is arranged as a wheel arch heat exchanger is or in front of at least one of the wheel arches 9 of vehicle 1. The term wheel arch heat exchanger refers to a heat exchanger located between the front bumper and front wheel arch cover or in the interior of wheel arch 9 or the mudguard, and which is by the air flowing there because of the forward movement of vehicle 1. The advantage of such a wheel arch heat exchanger lies in the fact that it can be located in an area of vehicle 1 without being visible to the outside in the design of the vehicle.

Figure 4:
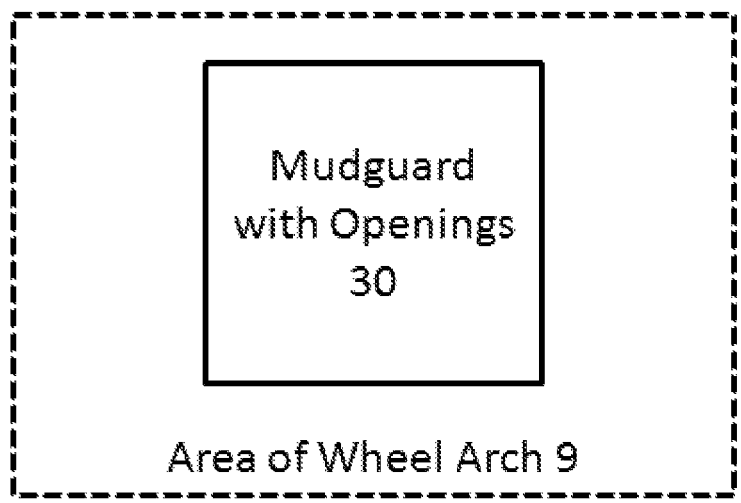

In order now to achieve the best-possible throughflow of this climate control cooling heat exchanger 8 as wheel arch heat exchanger and in particular in the case that the vehicle is stationary, so as not to experience circulated of the warmed air in the interior of wheel arch 9, the climate control cooling heat exchanger 8 can be affected by the airflow in the wheel arch and the cooling air that is flowing away is dissipated, for example by corresponding openings in the mudguard 30 in an area of wheel arch 9, which is shown in a highly schematic form in FIG. 4 and is also already known. Additionally, the inflowing air streams into climate control cooling heat exchanger 8 at a lesser height above road surface 10, than the height at which it flows out through the opening in the mudguard. This achieves a flue effect, so that the warm air flowing off upwards exercises a drawing effect on the climate control heat exchanger 8 and sucks in fresh air through wheel arch 9, which can correspondingly cool climate control cooling heat exchanger 8. This effect occurs independently of the motion-related airflow, so that a certain cooling effect can be achieved even if vehicle 1 is stationary, without the need for corresponding fans or similar, in order to achieved forced convection. As illustrated in highly schematic form in FIG. 3, the air flow to the climate control cooling heat exchanger 8 can be implemented by side air inlets 40 in a lower area of the vehicle front.

In the representation in FIG. 2, cooling circuit 5 can again be seen great detail. Cooling circuit 5 consists of a first section, the so-called high-temperature cooling circuit, which serves for cooling of a fuel cell stack 11 of fuel cell system 2. This fuel cell stack 11 can in particular be in the form of a stack of PEM fuel cells, which, as so-called low-temperature fuel cells, currently represent the most-widely-used fuel cells used in vehicle applications. A cooling medium flows into this first section of cooling circuit 5, for example the water and anti-freeze mixture already mentioned, which is transported in the first section of cooling circuit 5 by means of a cooling medium transportation device 12, which for example can be driven by an electric motor 13. In the area of fuel cell stack 11 itself, a valve device 14 can be provided, which correspondingly regulates the throughflow through fuel cell stack 11. In addition, cooling circuit 5 can include further elements, such as for example a filter 15 and a compensation tank 16, which are shown here in exemplary form. The cooling medium warmed in fuel cell stack 11 now flows via cooling medium transportation device 12 to a first stage 6a of cooling heat exchanger 6 which is correspondingly flowed through by motion-related airflow F, in order to cool the cooling medium. After this it reaches a second stage 6b of the cooling heat exchanger serially downstream in the direction in the cooling medium, which is also flowed-through by motion-related airflow F, so that in second stage 6b of cooling heat exchanger 6 the cooling medium is cooled further. The cooling medium then returns into fuel cell stack 11 via a 3-way valve 17 and via filter 15. The 3-way valve 17 is known for use in such high-temperature cooling circuits in fuel cell systems 2 and in particular serves, during the start phase of fuel cell stack 11, to pump the cooling medium in the circuit only through fuel cell stack 11 and possibly other components to be cooled 18, indicated here as optional, without cooling these correspondingly in cooling heat exchanger 6, so that fuel cell stack 11 heats up relatively rapidly and achieves its operating temperature quickly.

Cooling circuit 5 in the representation of FIG. 2 also includes a second section, which is designed as a low-temperature cooling circuit and in particular cools the vehicle drive with its motor 4 and the corresponding power electronic components 3 of fuel cell system 5. Also in the operation of the elements of the vehicle drive and the power electronics which are here flowed-through in parallel, corresponding valve devices 19 are provided, which enable the throughflow to be set accordingly. Instead of an independent low-temperature cooling circuit, as is often exhibited in the state of the art, here the second section which is used as low-temperature cooling circuit, is integrated into cooling circuit 5 for fuel cell system 2. This second section exhibits an independent low-temperature cooling heat exchanger 20 and can make use of an independent optional cooling medium transportation device 21, in so far as this is necessary. Optional cooling medium transportation device 21 should in any case lie at a lower geodetic height than compensation tank 16. This second partial section of cooling circuit 5 functions in such a way that the cooling medium contained in it flows over low-temperature heat exchanger 20 after flowing through the elements of the drive or the electrical machine 4 and the electronic components 3 to be cooled and then is mixed with the cooling medium in section of the cooling circuit. The partial flow required for the second section is then again taken from cooling circuit 5 before reaching 3-way valve 17, in order also to be able to guarantee corresponding cooling of the electrical or electronic components 3, 4 in the warm-up phase of fuel cell stacks 11. Depending on the arrangement of cooling medium transportation device 12 in cooling circuit 5, it may be possible to omit the optional cooling medium transportation device 21. Both the low-temperature cooling heat exchanger 20 and stage 6b of cooling heat exchanger 6 are linked with compensation tank 16 via venting lines.

Low-temperature cooling heat exchanger 20 and the two stages 6a, 6b of cooling heat exchanger 6 described here are arranged serially behind one another in the direction of the motion-related airflow F that is flowing through them, so that they are flowed through serially one after the other by cooling motion-related airflow F. This means that the surface of the cooling heat exchanger in the front area of vehicle 1 is only required once for all three cooling heat exchangers together, in order to ensure throughflow of cooling heat exchangers 20, 6. Motion-related airflow F first flows through low-temperature cooling heat exchanger 20 and is slightly warmed in this process. This slightly warmed motion-related airflow F then flows through second stage 6b of cooling heat exchanger 6 and cools the cooling medium that was already pre-cooled in stage 6a of the first section of cooling circuits 5 down to the required temperature. After this, motion-related airflow F, which has in the meantime been considerably warmed, enters first stage 6a of cooling heat exchanger 6 and here undertakes a type of "pre-cooling" of the cooling medium in first section of cooling circuit 5. By means of this design, very efficient cooling of the fuel cell system with all its components can be achieved with a minimum requirement for surface area in the front of vehicle 1. Based on the two linked stages 6a, 6b of cooling heat exchanger 6 and low-temperature cooling heat exchanger 20, throughflow of this stack at cooling heat exchangers 6, 20 may be restricted. At least in certain situations or in the case of high outside temperatures around vehicle 1 it can be useful and helpful to correspondingly strengthen throughput by motion-related airflow F by means of a fan 22 and by these means to achieve forced convection of the cooling air in the stack of cooling heat exchangers 6, 20. This design with fan 22, which in particular can be operated or not depending as a result of temperature-related control, is also known from many vehicles with conventional internal combustion engines and is in common use for cooling of cooling heat exchangers in vehicles.

The installation of cooling circuit 5 for fuel cell system 2 is designed completely independently of climate control device 7 of vehicle 1, which can also be seen in the representation of FIG. 2. This basically consists of an expansion valve 23, and an evaporator 24 for cooling of the interior space of vehicle 1, which is here illustrated by the heat flow with the arrow designated as B. In addition, climate control device 7 exhibits a so-called internal heat exchanger 25, which is known and in common use for raising of efficiency in climate control devices 7. In addition, a compressor 26 can be included, which, in the embodiment described here, feeds the climate-control medium of climate control device 7 to two climate control cooling heat exchangers 8, in which the medium is cooled and/or condensed. As already mentioned in the description of FIG. 1, these climate control heat exchangers 8 are designed to be independent of cooling circuit 5 of fuel cell system 2 and can in particular be located in the wheel arches 9 of vehicle 1. In the representation shown in FIG. 2, two of the climate control cooling heat exchangers 8 can be seen, which can, for example, be arranged in the right and left front wheel arches 9 of vehicle 1.

The installation shown in the representation in FIG. 2 now has, as already mentioned, the particular advantage that it can be implemented with the surface flowed against for cooling heat exchangers 20, 6 which is typically available based on the design of vehicle 1 in the front area of the installation. Because of the stack of the low-temperature cooling heat exchanger 20 and the individual stages of cooling heat exchanger 6, the best-possible cooling of the cooling medium can be achieved in cooling circuit 5 with the surface available, and with it the best-possible cooling of fuel cell stack 11. This means that high performance capacity of fuel cell stack 11 can be achieved, without its performance being limited because of inadequate cooling.

This very compact and efficient structure of cooling circuit 5 in FIG. 2 ensures the best-possible cooling in a vehicle 1 with a fuel cell system 2. However, use of cooling heat exchanger 6 divided into two or even more than two stages could also be implemented, if appropriate, in the form of a cooling circuit 5 in which, analogous to the state of the art, a low-temperature cooling circuit for electrical or electronic components 3, 4 is provided independently from the high-temperature cooling circuit for fuel cell 11 and also, if appropriate, for further components cooled in it.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A vehicle with at least one cooling circuit for cooling of a fuel cell system, wherein the cooling circuit comprises:
    a cooling heat exchanger that includes a first stage and a second stage arranged in such a way that the first and second stages are flowed through serially, one after another by motion-related airflow;
    a cooling medium transportation device; and
    a heat exchanger in a fuel cell stack of the fuel cell system,
    wherein the first and second stages of the cooling heat exchanger are flowed through serially, one after another, by a cooling medium flowing in cooling circuit,
    wherein the second stage is flowed through last by motion-related airflow and first by the cooling medium.

2. The vehicle according to claim 1, wherein the cooling circuit is a high-temperature cooling circuit exclusively dedicated to cool the fuel cell stack.

3. The vehicle according to claim 1, wherein
    the cooling circuit includes a first section as high-temperature cooling circuit for cooling the fuel cell stack,
    a second section, which is parallel to the cooling heat exchanger, is constructed as low-temperature cooling circuit for cooling of electrical or electronic components,
    a low-temperature cooling heat exchanger is arranged in the cooling circuit parallel to the first and second stages of the cooling heat exchanger and is located in such a way that the low-temperature cooling heat exchanger is flowed through by the motion-related airflow serially in relation to the first and second stages of the cooling heat exchanger.

4. The vehicle according to claim 3, wherein the low-temperature cooling heat exchanger is arranged in such a way that it is flowed through by the motion-related airflow serially before the first and second stages of the cooling heat exchanger.

5. The vehicle according to claim 3, wherein the first and second stages of the cooling heat exchanger and of the low-temperature cooling heat exchanger are arranged in a front area of the vehicle.

6. The vehicle according to claim 3, wherein in an area of the first and second stages of the cooling heat exchanger and of the low-temperature cooling heat exchanger a fan is provided in order to strengthen the through-flow with cooling air.

7. The vehicle according to claim 3, wherein the first and second stages of the cooling heat exchanger and of the low-temperature cooling heat exchanger are arranged in a same surface affected by the motion-related airflow and are arranged as a stack behind one another.

8. The vehicle according to claim 1, wherein the fuel cell stack is constructed as a stack of PEM fuel cells.

9. A vehicle with at least one cooling circuit for cooling of a fuel cell system, wherein the cooling circuit comprises:
    a cooling heat exchanger that includes a first stage and a second stage arranged in such a way that the first and second stages are flowed through serially, one after another by motion-related airflow;
    a cooling medium transportation device;
    a heat exchanger in a fuel cell stack of the fuel cell system; and
    a climate control device that includes at least one climate control cooling heat exchanger in order to cool a climate control medium used in the climate control device, wherein the climate control cooling heat exchanger is separate from the cooling circuit for fuel cell system.

10. The vehicle according to claim 9, wherein the at least one climate control heat exchanger is located in or in front of one wheel arch of the vehicle.

11. The vehicle according to claim 10, wherein air flow to the at least one climate control cooling heat exchanger is implemented by the wheel arches of the vehicle or by side air inlets in a lower area of a front of the vehicle, while air is vented through openings in a mudguard in an area of wheel arch.

12. The vehicle according to claim 11, wherein an area of air intake is located at a lower height over road surface than the openings for air venting.

\* \* \* \* \*